United States Patent [19]
Windish et al.

[11] Patent Number: 5,379,584
[45] Date of Patent: Jan. 10, 1995

[54] SYNTHESIS OF CRITICAL TEMPERATURE OF A TURBINE ENGINE

[75] Inventors: David K. Windish; James D. Harris; Darin J. McDaniel, all of Phoenix, Ariz.

[73] Assignee: AlliedSignal Inc., Morris Township, Morris County, N.J.

[21] Appl. No.: 931,913

[22] Filed: Aug. 18, 1992

[51] Int. Cl.$^6$ .................. B63H 11/00; G06F 15/48
[52] U.S. Cl. .................. 60/204; 364/431.02
[58] Field of Search .............. 60/204, 39.24, 39.281; 364/431.02

[56] References Cited

U.S. PATENT DOCUMENTS

| | | | |
|---|---|---|---|
| 3,636,335 | 1/1972 | Nelson et al. | 364/431.02 |
| 3,844,114 | 10/1974 | Nonnenmann et al. | 60/39.281 |
| 4,212,161 | 7/1980 | Newirth et al. | 60/39.281 |
| 4,228,650 | 10/1980 | Camp | 60/39.281 |
| 4,414,807 | 11/1983 | Kerr | 60/204 |
| 4,594,849 | 6/1986 | Kenison et al. | 364/431.02 |
| 4,722,061 | 1/1988 | Carlisle et al. | 364/494 |
| 4,748,804 | 6/1988 | Krukoski | 60/39.281 |
| 4,773,213 | 9/1988 | Krukowski et al. | 60/39.281 |

Primary Examiner—Richard A. Bertsch
Assistant Examiner—Howard R. Richman
Attorney, Agent, or Firm—James W. McFarland

[57] ABSTRACT

A critical parameter for a device is generated as follows. The critical parameter is modeled. When the device is operated under steady-state conditions, the modeled parameter is corrected by a measured parameter known to be accurate under steady state operating conditions. The correction accounts for errors which may be present in the synthesis of the critical parameter and normal anticipated performance variation of the device. When the device is operated under transient conditions, however, the correction of the modeled parameter is based upon previous steady-state conditions. Thus, the apparatus generates a theoretical parameter during transient operating conditions.

9 Claims, 5 Drawing Sheets

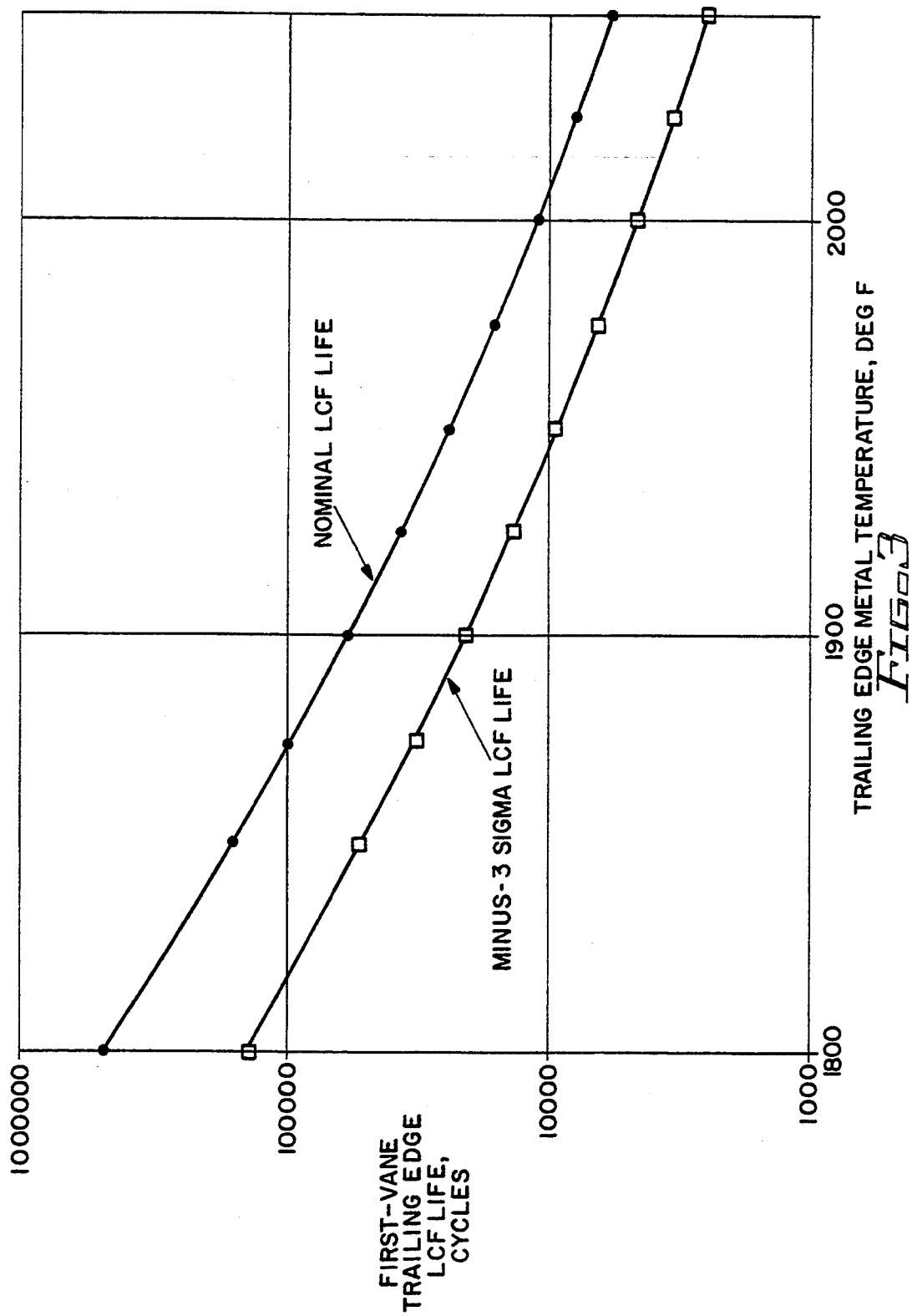

SYNTHESIS OF CRITICAL TEMPERATURE OF A TURBINE ENGINE

This invention was made with government support under contract No. DAAJ-0985C-B017 awarded by the Department of the Army. The government has certain rights in this invention.

BACKGROUND OF THE INVENTION

This invention relates in general to synthesis of critical device parameters and in particular to apparatus and method of synthesizing a critical temperature of a stator vane.

In that fiery inferno known as a gas turbine engine, chemical energy is converted to mechanical energy. Referring to FIG. 1, compressors LPC and HPC convert ambient air to high pressure air. The air is continuously delivered to a combustor COMB which, through the combustion of fuel, raises the temperature and pressure of the air before it is delivered to a first stage high pressure (HP) turbine HPT. The hot, high pressure air is expanded across the HP turbine, producing shaft power to drive the compressors LPC and HPC. The energy remaining is passed across a low pressure turbine LPT which provides output shaft power. Alternatively, the energy can be passed through an exhaust nozzle which provides a "jet" thrust. The engine stations are as follows:

| STATION | DESCRIPTION |
| --- | --- |
| 0 | FREE STREAM |
| 1.0 | ENGINE INLET |
| 2.0 | LOW PRESSURE COMPRESSOR INLET |
| 2.5 | HIGH PRESSURE COMPRESSOR INLET |
| 3.0 | HIGH PRESSURE COMPRESSOR DISCHARGE/COMBUSTOR INLET |
| 4.0 | COMBUSTOR DISCHARGE |
| 4.1 | 1ST STAGE HIGH PRESSURE TURBINE ROTOR INLET |
| 4.5 | GAS GENERATOR DISCHARGE/POWER TURBINE INLET |
| 5.0 | POWER TURBINE DISCHARGE |

The stator vane 72 of the HP turbine is considered one of the more critical components from a thermal stress point of view (see FIG. 2). The selected critical hot spot of the turbine engine is at the first stage turbine vane, trailing edge, pressure side. This spot is designated generally by reference numeral 74. Gases are hottest at the combustor exhaust, reaching as high as 3000° F., under transient operating conditions. These gases heat the outer portion of the vane 72, especially the pressure side, trailing edge. Because the turbine vane 72 is cooled internally by air diverted from the compressor, a temperature gradient results between the inner and outer portions of the vane 72. The higher the temperature gradient, the greater becomes the thermal stress.

These high gradients often make the HP turbine vane the most likely engine component to fail. Failure is primarily due to low cycle fatigue (LCF). Each engine acceleration and deceleration induces a cycle of thermal stress. The graph of FIG. 3 shows a relationship of peak vane temperature versus LCF turbine life. In the engine's maximum power operating range, a small increase of vane temperature can reduce the service life by a substantial amount. In this case, an increase of only 150° F. can reduce the operating life by 2250 cycles.

To prevent turbine damage induced by excessive, prolonged combustor outlet gas temperature, the engine is operated at a turbine peak temperature that is several degrees below the vane's critical life cycle fatigue temperature. Normally, the turbine is protected by the engine control unit (ECU) based on a measured gas temperature (MGT) at the outlet of the HP turbine, station 4.5. With the engine operating at steady-state operating conditions, adequate engine life can be assured by limiting peak temperature based on MGT. During transient operation, however, peak temperature may be exceeded because the response of the MGT is inadequate and does not reflect the true critical turbine temperature.

The MGT does not reflect true critical temperature because the thermocouple probes at the HP turbine exit are constructed for accuracy and durability, not quick response. The MGT thermocouple probe construction results in a lag with third order characteristic, which is very difficult to compensate for with measurements available to the ECU. The result is relatively slow response characteristics as compared to that of the critical first stage turbine hardware. With the engine capable of accelerating from idle to maximum power in just over a couple of seconds, transient gas temperatures quickly increase by more than 2000° F. Thus, thermocouple probe heat transfer characteristics make meaningful signal compensation a difficult task.

Although consideration of this signal lag is not critical for engine accelerations of long duration, the delay becomes most significant when attempting to accurately compensate for thermocouple dynamics during rapid accelerations of short duration.

SUMMARY OF THE INVENTION

Accurate and responsive measurements are made by the present invention, which relates to apparatus for synthesizing a critical parameter of a device. The apparatus comprises means for synthesizing the critical parameter according to a mathematical model, measuring means for taking a measurement on the device, and correcting means, operative on the synthesizing means, for correcting the critical parameter with the measurement when the device is operating under steady-state conditions.

This apparatus can be adapted to synthesize the critical temperature of the HP turbine vane, pressure side, trailing edge. The measured turbine temperature is taken at the outlet of the HP turbine.

BRIEF DESCRIPTION OF THE DRAWINGS

FIG. 3 is a plot of low cycle fatigue life temperature sensitivity for the first stage vane, trailing edge.

FIG. 7 is a logic diagram of a routine for synthesizing gas temperature at the first stage turbine inlet.

DETAILED DESCRIPTION OF THE PREFERRED EMBODIMENT

Figure 1:
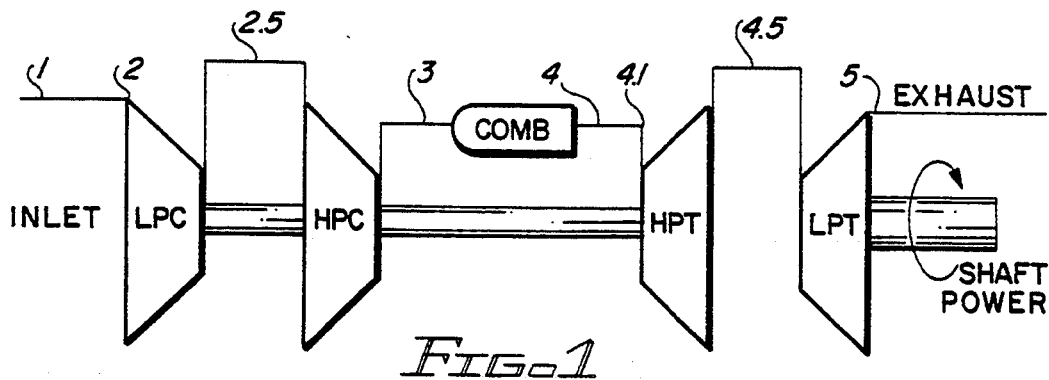
FIG. 1 shows station designations of a turbine engine.
Figure 2:
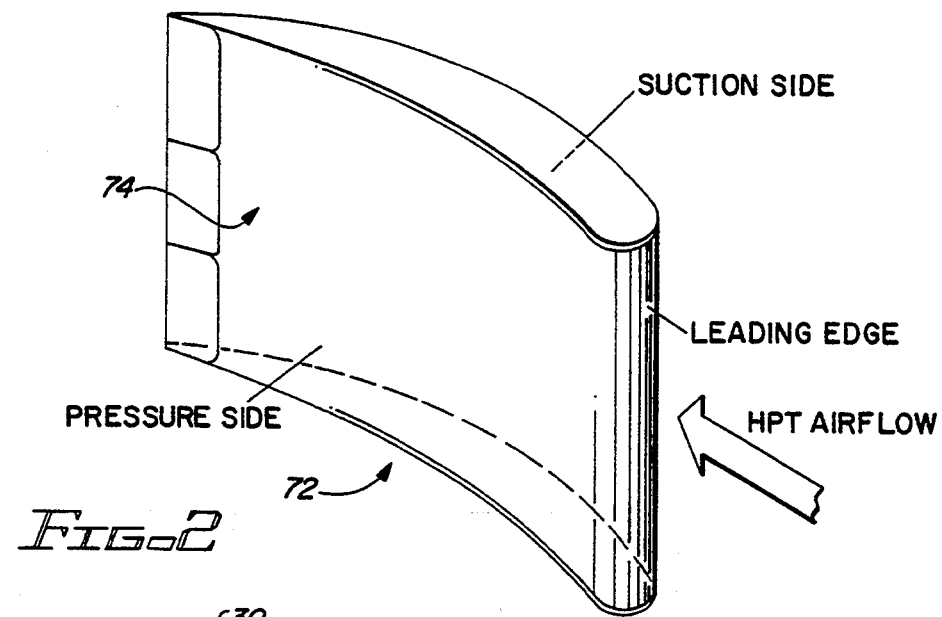
FIG. 2 is a perspective view of a first stage turbine vane showing location of critical turbine temperature.
Figure 4:
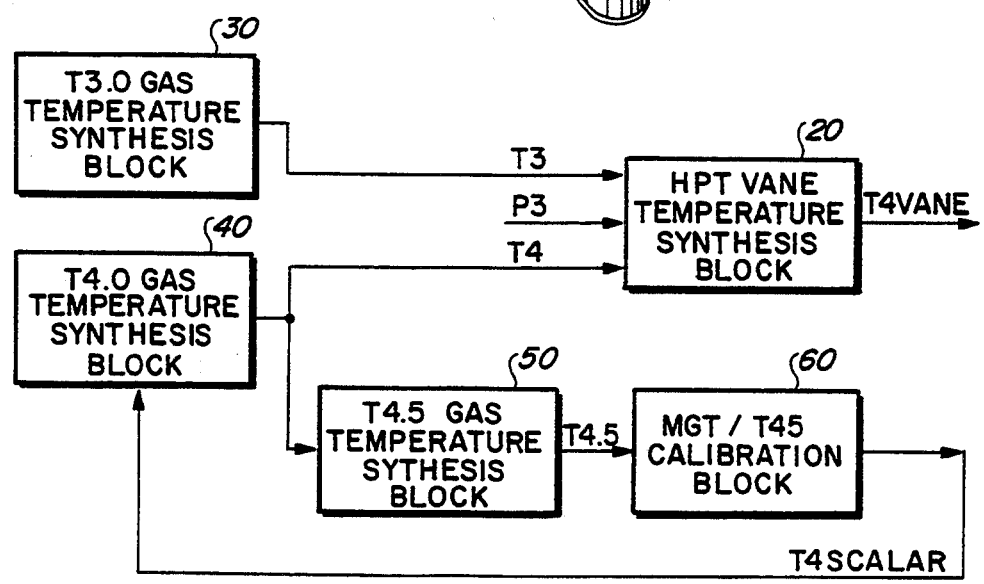
FIG. 4 is a block diagram of apparatus for synthesizing first stage turbine vane temperature in accordance with the present invention.

Referring now to FIG. 4, a logic block 20 calculates HP turbine stator vane critical temperature T4VANE from compressor discharge gas temperature T3, compressor discharge pressure P3, and HP turbine inlet temperature T4. These parameters model the thermal storage characteristics of the vane. Compressor discharge gas temperature T3 is the temperature of the air cooling the inner portion of the vane; compressor discharge pressure P3 is proportional to the mass flow of gas entering the HP turbine inlet; and HP turbine inlet temperature T4 is the temperature of the gas heating the outer portion of the vane. Compressor discharge gas pressure P3 is measured by a pressure sensor resident in the ECU. Compressor discharge gas temperature T3 is derived by logic block 30. High pressure turbine inlet temperature T4 is synthesized by block 40.

Temperature T4 is corrected by trim scalar T4SCALAR, which is generated by a calibration block 60. The calibration block compares MGT to a synthesized temperature T4.5. Here MGT is taken at station 4.5; therefore a synthesis block 50 is required to synthesize temperature T4.5 from temperature T4. The resulting scalar T4SCALAR is used to tune the temperature T4 under steady state operating conditions. The non-dimensional output gain of the calibration block 60 acts on fuel ratio units WFP3C. Temperature T4 synthesis errors caused by fuel type (specific gravity and lower heating value) are nulled out. The calibration block 60 also trims out errors induced by fuel control calibration drift which may occur over the service life of the fuel control. During a transient condition, however, the scalar T4SCALAR is held constant by the calibration block 60, as the synthesized temperature T4.5 does not match MGT.

This synthesized vane temperature T4VANE is input to a turbine temperature limiter control (not shown), which in turn provides protection from thermal low cycle fatigue of the HP turbine. The turbine temperature limiter utilizes the temperature T4VANE for transient temperature limiting as required for extreme engine health degradation, customer power extraction and other unanticipated installation effects that affect transient turbine temperatures through the life of the engine.

Figure 5:
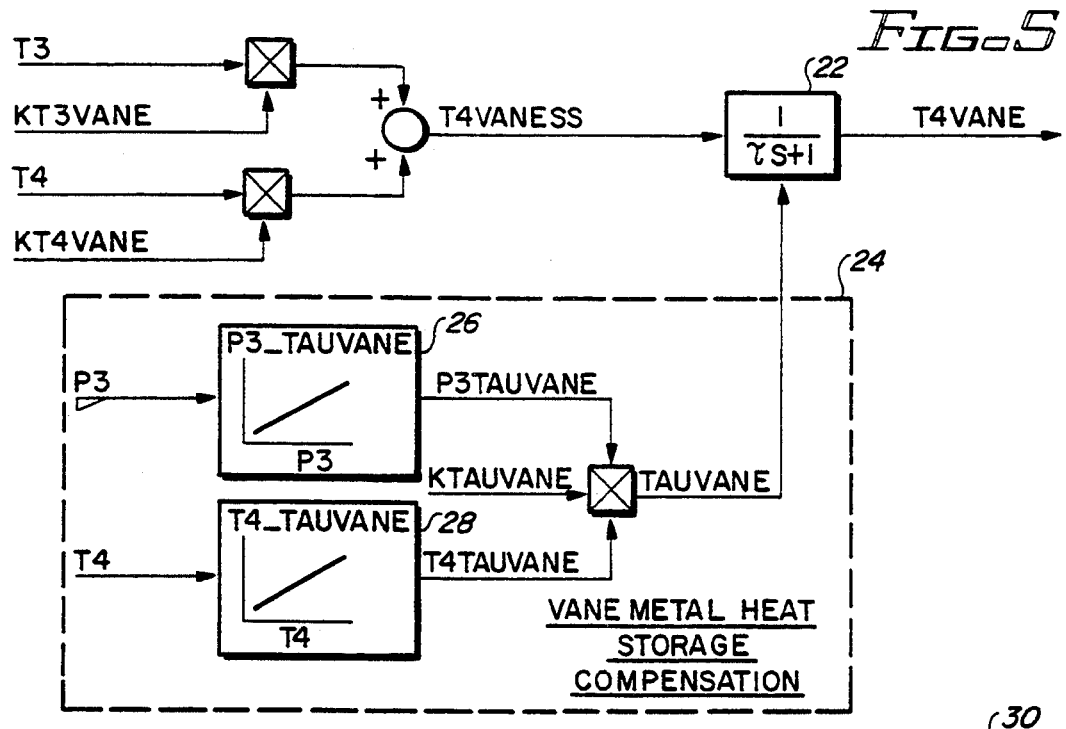
FIG. 5 is a logic diagram of a routine for synthesizing vane temperature of the high pressure first stage turbine.

FIG. 5 shows how block 20 synthesizes critical temperature T4VANE at the high pressure turbine stator vane trailing edge pressure side from engine parameters T3, P3 and T4. Compressor discharge gas temperature T3 is multiplied by gain factor KT3VANE to provide a signal which is proportional to the cooling influence that compressor discharge flow has on the stator vane. Similarly, turbine inlet temperature T4 is multiplied by gain factor KT4VANE to provide a signal which is proportional to the heating influence that turbine inlet gas flow has on the stator vane. The influences of temperatures T4 and T3 are summed together to provide steady-state vane temperature T4VANESS. To account for transient heat storage rate of the critical turbine stator vane, a block 22 applies a first order thermal time constant lag to temperature T4VANESS. The lag characteristic TAUVANE is provided by block 24. Vane transient heat transfer rate is influenced primarily by gas pressure, gas temperature, stator vane mass and thermo-physical properties of the vane. Look-up tables 26 and 28 account for the influences P3TAUVANE and T4TAUVANE of parameters P3 and T4 on thermal time constant. Scalar KTAUVANE accounts primarily for the mass and thermo-physical heat transfer properties of the vane. The product of these three influences P3TAUVANE, KTAUVANE and T4TAUVANE provide the first order lag characteristic TAUVANE, approximating the transient response of the high pressure turbine stator vane temperature.

Figure 6:
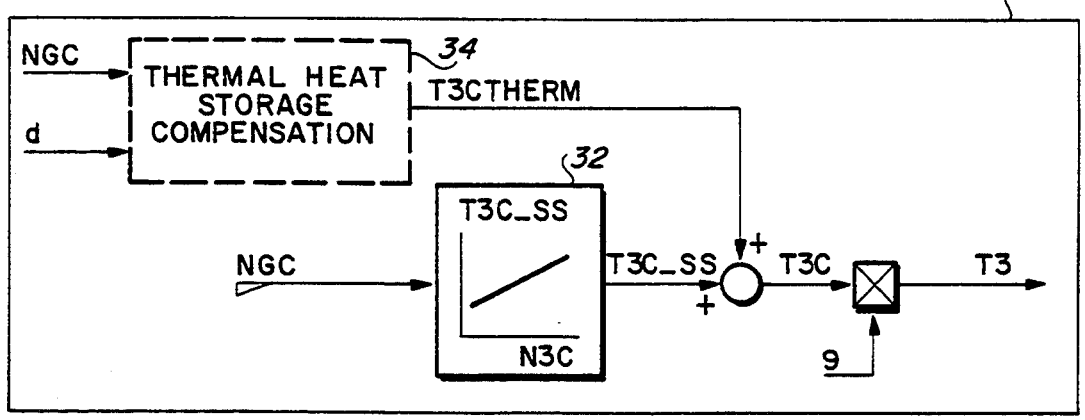
FIG. 6 is a logic diagram of a routine for synthesizing gas temperature at the compressor outlet.

FIG. 6 shows how block 30 synthesizes compressor discharge temperature T3. Steady state corrected compressor discharge temperature T3CSS is approximated from corrected gas generator speed by a look-up table 32. To account for heat storage effects of the compressors, a bias term T3CTHERM is added to the steady state compressor discharge temperature T3CSS. While the heat storage effects of the compressor are of higher order and difficult to model precisely, a first order thermal washout function 34 can approximate the heat storage effects within reason. Compressor gas flow rate is assumed the primary influence of transient variation in compressor heat storage effects. Therefore, corrected gas generator speed NGC coupled with relative inlet pressure ratio d can be utilized to approximate the mass flow influence of the compressor within reason. Compressor discharge pressure P3 could be used as an alternative. The heat storage effects T3CTHERM are summed with the steady-state compressor discharge temperature T3CSS to form corrected compressor discharge temperature T3C. Temperature T3C is uncorrected by relative inlet temperature ratio q to physical compressor discharge temperature T3, which is provided to the vane temperature synthesis block 20.

FIG. 7 shows how the block 40 synthesizes high pressure turbine inlet temperature T4 and tunes it with the scalar T4SCALAR. An indication of combustor fuel flow is provided by metered fuel flow feedback signal WFM. The metered fuel flow is corrected by the square root of relative inlet temperature ratio q. This method of correcting fuel flow is well known in the art of gas turbine performance modeling. Corrected fuel flow is divided by compressor discharge pressure P3 and scaled by the scalar T4SCALAR to provide an indication of effective fuel ratio units WFP3CMOD. A three-temperature look-up table 42 computes corrected combustor outlet temperature T4CBASE based on corrected gas generator speed NGC and fuel ratio units WFP3CMOD entering the combustor. This simplified lumped parameter method of computing combustor outlet temperature is well known to those experienced in the art of turbine engine performance modeling and usually requires empirical verification through engine rig testing.

Look-up table 42 provides a steady state model of combustor outlet gas temperature. Levels of combustor efficiency and heat storage/rejection depend upon combustor air flow and fuel flow. Under transient operating conditions, the combustor and HP turbine are subject to extreme variations in gas temperatures. Transitions in heat storage/rejection rates must be considered because their effects are demonstrated and significant. Therefore, a heat storage effects term T4CTHERM must be added to the combustor outlet gas temperature T4CBASE. A thermal heat storage compensation block 44 utilizes a first order thermal washout function to approximate first stage turbine thermal effects within reason. Combustor gas flow rate is assumed to be the primary influence of transient combustor heat storage/rejection effects. Corrected gas generator speed NGC coupled with relative inlet pressure ratio d approximates the mass flow rate of the combustor within reason. Combustor inlet pressure P3 could be used instead. The heat storage effects term T4CTHERM is summed with the steady-state combustor outlet gas temperature T4CBASE to form corrected turbine inlet gas temperature T4C. Turbine inlet gas temperature T4C is uncorrected by the relative inlet temperature ratio q to HP turbine inlet temperature T4.

Figure 8:
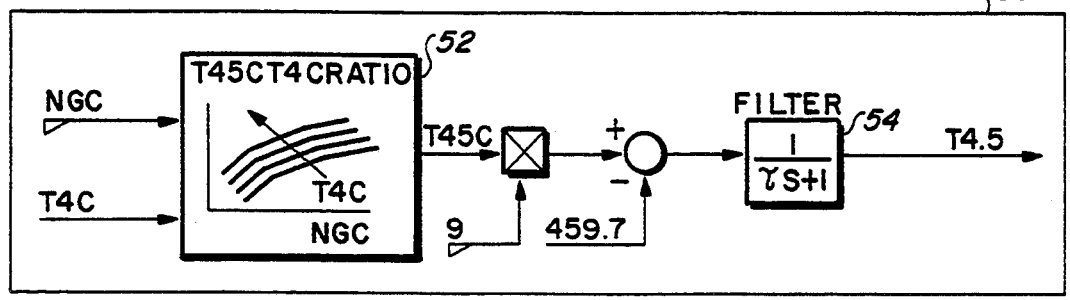
FIG. 8 is a logic diagram of a routine for synthesizing gas temperature at the first stage turbine outlet (interstage turbine temperature).

FIG. 8 shows how block 50 synthesizes HP turbine outlet temperature T4.5, which is the location chosen for sensor measurement of MGT. A three-dimensional piece-wise linear map 52 synthesizes corrected HP turbine outlet temperature T4.5C from corrected turbine inlet temperature T4C and corrected gas generator speed NGC. Temperature T4.5C is uncorrected to physical temperature by relative inlet temperature ratio q and factor 459.7. A digital filter 54 smoothes out digital noise amplified by the look-up table 52.

The conversion of HP turbine inlet gas temperature T4 to HP turbine outlet gas temperature T4.5 is a direct result of thermal energy extracted from the HP turbine and utilized to drive the compressor. To convert gas temperature T4 to T4.5, a constant nominal turbine efficiency is assumed. Losses of HP turbine efficiency whether induced through improper build clearances or turbine performance degradation are not accounted for, but should not be forgotten. The engine monitoring system (EMS) of this engine system evaluates engine health and provides the engine operator an indication in the event of significant performance loss. Since temperature T4.5 is only required by the calibration block 60 under thermally steady-state operating conditions, compensation for transient thermal effects is not required here.

Modeling of gas temperatures T3, T4, and T4.5 is well known to those skilled in the art, given accurate accounts of engine inlet conditions, turbine spool speed(s), combustor inlet pressure and fuel flow. Methods of accounting for heat storage and thermal effect on engine efficiencies are less known and depend upon the level of transient modeling required for successful development and certification of the turbine engine.

Figure 9:
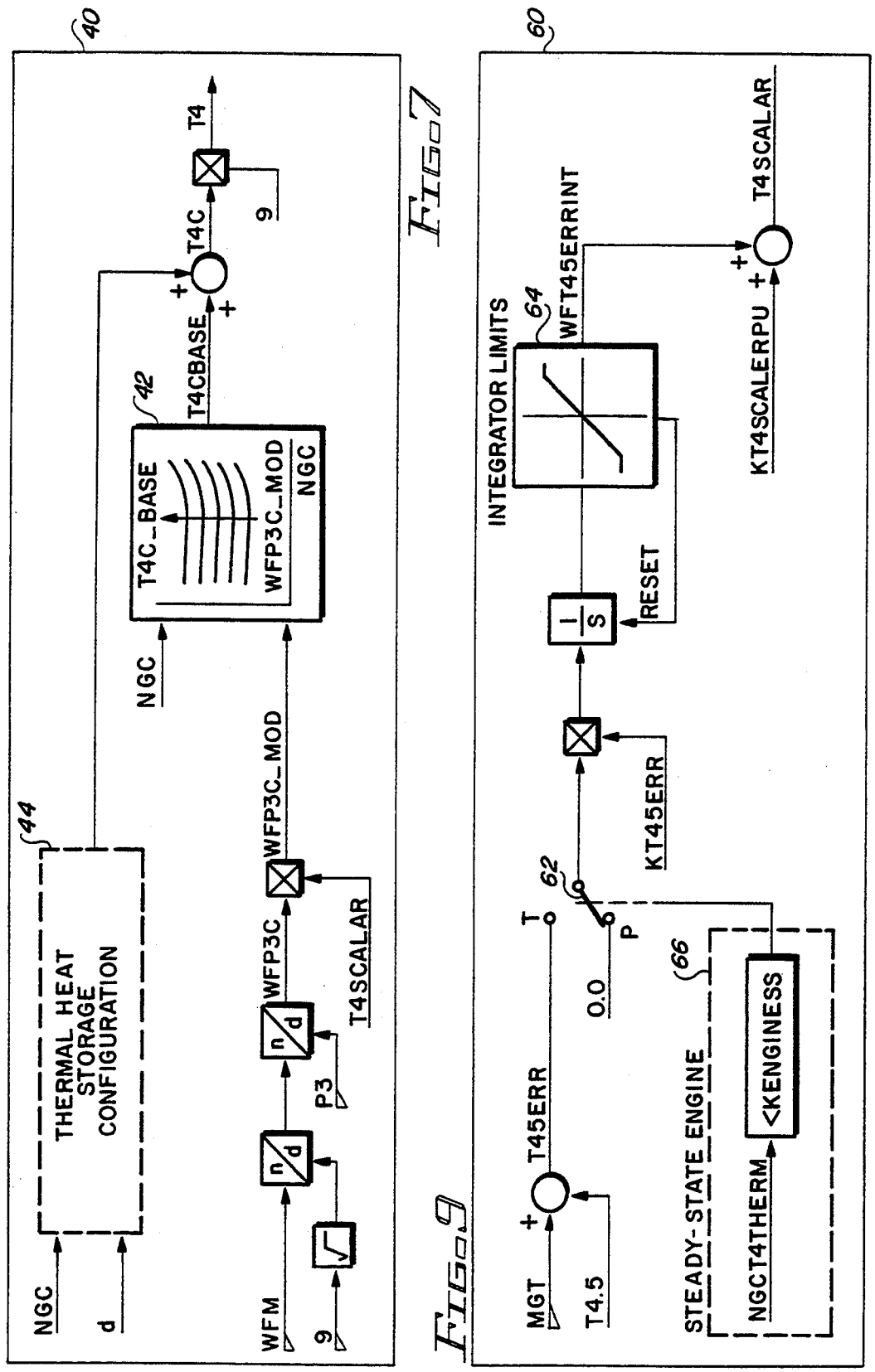
FIG. 9 is a logic diagram of a routine which calibrates or trims the logic for synthesizing interstage turbine temperature.

FIG. 9 shows how block 60 computes the fuel flow scalar T4SCALAR. HP turbine outlet temperature T4.5 is compared to MGT which is measured at station 4.5, the HP turbine outlet. Resulting is an error signal T45ERR. A switch 62 selects either the error signal T45ERR or a value 0.0. Under thermally steady-state operating conditions, the switch 62 selects error signal T45ERR which is integrated with gain KT45ERR and limited by logic block 64 to preclude excessive loss of engine transient response. Signal WFT45ERRINT provided on the output of logic block 64 is added to nominal or default "power-up" trim parameter KT4SCALERPU. This default trim parameter might be implemented to recall the last active value of T4SCALAR from the last engine run, reducing the work load of the integrator from engine shut-down to start-up. The effects of variation in fuel specific gravity on burner discharge gas temperature is anticipated to be the most significant driver of error resulting in the integration of T4SCALAR. Unless the fuel type is changed, engine overhauled, or fuel control replaced, chances are the trim value will remain relatively constant from engine start to start.

Under thermally transient operating conditions, however, the switch 64 selects the value 0.0. Thus, the scalar T4SCALAR is held constant until the engine returns to steady-state operating conditions.

The switch 62 is responsive to an output of block 66, which indicates transient operating conditions. This can be done in a number of ways. For example, the block 66 can utilize the heat storage effects term NGCT4THERM approximated from engine speed NGC by a first order washout function. When this term exceeds a limit KENGINESS, the block 66 indicates a transient operating condition.

Figure 10:
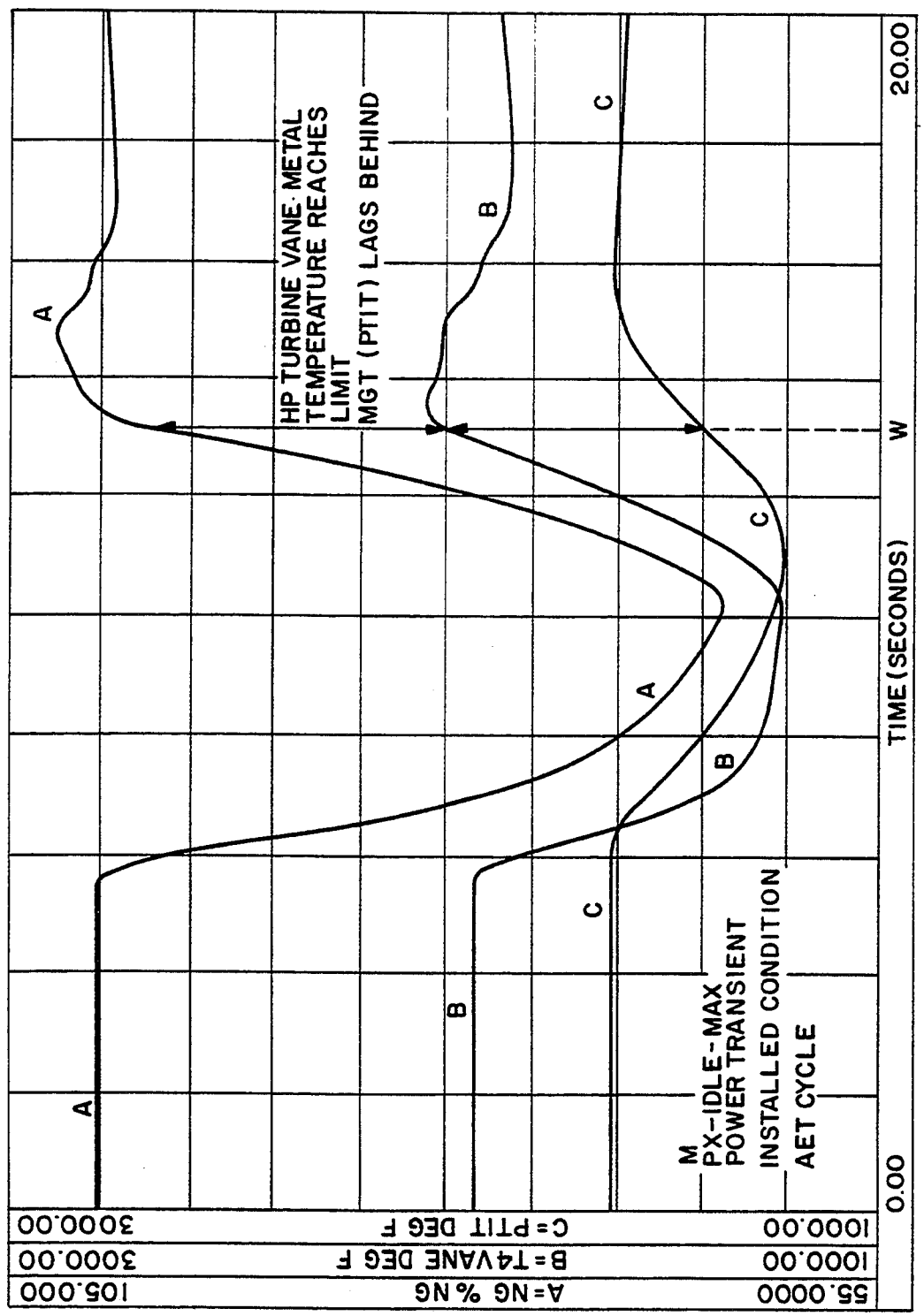
FIG. 10 shows the results of the apparatus of FIG. 4 when tested with a gas turbine engine.

This invention can be implemented as a software module in the turbine engine's digital electronic engine control. The temperature T4VANE would be calculated and refreshed at a rate of 40 frames per second. At this speed, critical turbine vane temperature T4VANE would be synthesized with adequate response and accuracy required by the application. FIG. 10 shows an actual response for an acceleration of an HP turbine from maximum to idle to maximum power. Line A indicates engine speed as a percentage of maximum rated engine speed; line B indicates turbine vane temperature in °F.; and line C indicates MGT in °F. In this case, the transient temperature limiter became active at time W, thereby maintaining critical turbine vane temperature T4VANE within prescribed limits. Note the relative lag of measured gas temperature MGT at the turbine interstage.

The present invention can be applied to any spot on the HP turbine stator vane having similar heat storage characteristics. Further, the present invention can be applied to any process where control of a critical system parameter is required. Therefore, it will be understood that the embodiment disclosed herein is merely exemplary and that a person skilled in the art may make many variations and modifications without departing from the spirit and scope of the invention. All such modifications are intended to be included within the scope of the invention as defined in the appended claims.

We claim:

1. An apparatus for indicating a first parameter of a gas turbine engine, comprising:

synthesizing means for synthesizing said first parameter according to a mathematical model;

measuring means for taking a measurement on said engine; and correcting means, operative on said synthesizing means, for correcting said first parameter with said measurement when said engine operates under steady-state conditions, said synthesizing means synthesizing said first parameter according to at least one input, said correcting means correcting said one input during steady-state operation of said engine, said correcting means including error signal means for generating an error signal from said measurement and said input during steady-state operation of said engine, and said synthesizing means including tuning means for tuning said input with said error signal.

2. The apparatus of claim 1, wherein said error signal means includes:
   first summing means for summing said measurement and said input;
   indicating means for indicating steady-state operation of said engine;
   selecting means, responsive to said indicating means, for selecting said sum when said indicating means indicates steady-state operation; and
   integrator means, responsive to said indicating means, for converting said sum into said error signal.

3. The apparatus according to claim 1, wherein said measurement is taken at a first location on said engine and said input indicates a second parameter at a second location on said engine, wherein said correcting means further includes transfer function means, responsive to said input, for synthesizing a third parameter corresponding to said first location on said engine, said error signal means generating said error signal from said measurement and said third parameter.

4. The apparatus of claim 3, wherein said engine has a combustor with an inlet and an outlet, at least one turbine with an inlet and an outlet, and a turbine stator vane, said first parameter being the temperature of said turbine stator vane, said first location being at said turbine outlet, and said second location being at said turbine inlet.

5. The apparatus of claim 4, wherein said synthesizing means synthesizes said stator vane temperature according to pressure at said combustor inlet, temperature at said combustor inlet and temperature at said combustor outlet, and wherein said input to said synthesizing means indicates temperature at said combustor outlet.

6. The apparatus of claim 5, wherein synthesizing means includes:
   pressure means for indicating said pressure at the combustor inlet;
   first synthesis means for synthesizing said temperature at the combustor inlet;
   second synthesis means for synthesizing said temperature at the combustor outlet, said second synthesis means including said tuning means for correcting said synthesized temperature at the combustor outlet with said error signal; and
   third synthesis means, responsive to said pressure means and said first and second synthesis means, for generating said turbine stator vane temperature.

7. An apparatus for synthesizing turbine vane temperature of a turbine engine including a combustor and at least one turbine, comprising:
   synthesizing means for synthesizing said turbine vane temperature from at least one input;
   measuring means for measuring gas temperature on said turbine engine;
   error signal means for generating an error signal from said measurement and said input during steady-state operation of said engine; and
   tuning means for tuning said input with said error signal during steady-state operation.

8. The apparatus of claim 7, wherein said error signal means generates a second error signal during transient operation of said engine, said second error signal being generated from said input and a value of said measurement taken when said transient operation begins, and wherein said tuning means tunes said input with said second error signal during transient operation.

9. The apparatus according to claim 8, wherein said gas temperature is measured at the outlet from said turbine, wherein said input indicates gas temperature at the inlet to said turbine, and wherein said error signal means further includes transfer function means, responsive to said input, for synthesizing a gas temperature at said outlet from the turbine, said error signal means generating said error signals from said measured and synthesized gas temperatures at said outlet from the turbine.

* * * * *